United States Patent [19]

Kobayashi

[11] 4,047,684
[45] Sept. 13, 1977

[54] ADJUSTABLE TILTER DEVICE USED FOR HOLDING OBJECTS SUCH AS MUSICAL INSTRUMENTS

[75] Inventor: Haruhiko Kobayashi, Hamamatsu, Japan

[73] Assignee: Nippon Gakki Seizo Kabushiki Kaisha, Japan

[21] Appl. No.: 692,490

[22] Filed: June 3, 1976

[30] Foreign Application Priority Data

June 13, 1975 Japan .................... 50-80386[U]

[51] Int. Cl.² .................... B61L 25/00; F16C 11/06
[52] U.S. Cl. .................... 248/122; 248/286
[58] Field of Search ............... 248/122, 124, 125, 185, 248/397, 279, 284, 278, 291, 289, 286, 326; 403/91, 92, 93, 94, 95, 96, 97, 98, 99, 101, 102

[56] References Cited

U.S. PATENT DOCUMENTS

| | | | |
|---|---|---|---|
| 963,913 | 7/1910 | Lyhne | 403/97 X |
| 1,282,676 | 10/1918 | Carlin | 248/124 |
| 1,697,710 | 1/1929 | Bostroem | 403/97 |
| 2,548,650 | 4/1951 | Brandt | 403/97 X |

FOREIGN PATENT DOCUMENTS

151,769  10/1955  Sweden .................... 248/124

*Primary Examiner*—J. Franklin Foss
*Attorney, Agent, or Firm*—Ostrolenk, Faber, Gerb & Soffen

[57] ABSTRACT

Adjustable tilter device used for holding objectives such as musical instruments at a desired level and position over the floor includes a stationary tilter block detachably connected to a standard of a stand and a movable tilter block detachably holding a stem and turnable relative to the stationary tilter block in order for the stem to assume any selected tilting direction with respect to the stationary tilter block. When the stand is used with the stem in the upright state, the stem is kept in axial alignment with the standard so that lateral deviation between the centers of gravity of the two elements should be minimized for stable holding of heavy objectives by the stand and the stem should be accommodated in the standard in a telescopic fashion for convenience in transportation and/or storage of the stand.

7 Claims, 7 Drawing Figures

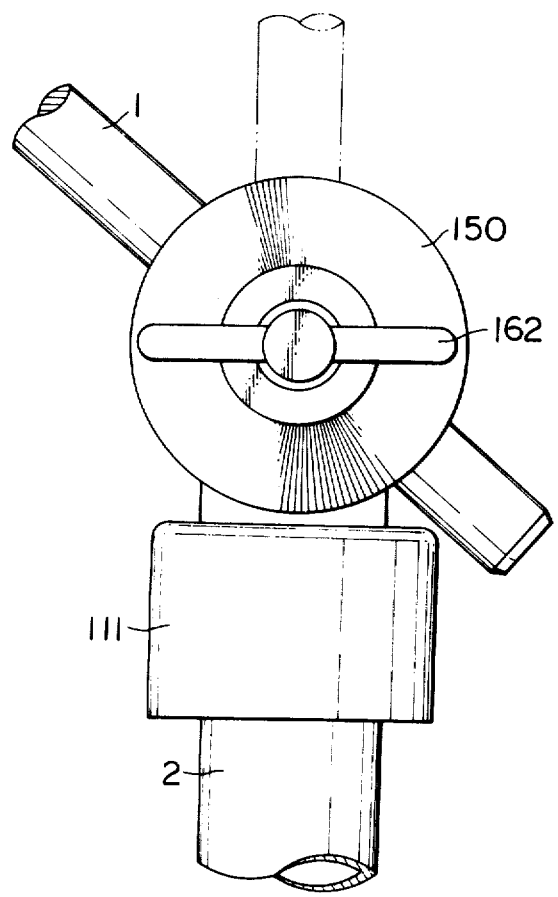

ADJUSTABLE TILTER DEVICE USED FOR HOLDING OBJECTS SUCH AS MUSICAL INSTRUMENTS

BACKGROUND OF THE INVENTION

The present invention relates to adjustable tilter devices used for holding objectives such as musical instruments and, more particularly, specifically relates to an improved construction for an adjustable tilter device used for holding objectives such as musical instruments and microphones at a desired level and position over the floor near the player or user.

The conventional stand for holding objectives such as musical instruments and microphones in general includes a standard supported at the lower end thereof by adjustable legs via a tripod and a stem turnably coupled atop the standard via a tilter device. The tilter device is of a tubular construction inserted over the stem and adjustably pivoted to the top end of the standard.

When the stem is put in the upright disposition with the above-described construction of the stand employing the conventional tilter device, the center axis of the stem is parallel to that of the standard. This parallelism in the center axes results in two fatal drawbacks.

Firstly, the center of gravity of the stem is laterally deviated from that of the standard. Thus, when a relatively heavy object is to be held by the stem, this deviation in the center of gravity tends to induce easy overturning of the stand with the object. In other words, the conventional tilter device cannot assure stable holding of the objects by the stand.

Secondly, when the stand is folded after use, the stem extends parallel to the standard and this parallel arrangement results in a relatively bulky folded construction of the entire stand which is quite inconvenient for transportation and storage of same.

BRIEF DESCRIPTION OF THE INVENTION

It is the primary object of the present invention to provide an adjustable tilter device used for holding objects such as musical instruments which enables stable holding of heavy objects by the stem even in the upright disposition.

Another object of the present invention is to provide an adjustable tilter device for holding objects such as musical instruments and which assures remarkably compact folded construction convenient for transportation and storage.

In accordance with the present invention, the tilter device is comprised of a stationary tilter block detachably mounted to a standard and a movable tilter block detachably holding a stem in such an arrangement that the stem in the upright state is in axial alignment with the standard. The two blocks are separably coupled to each other via a meshing engagement which is preferably established by serrations formed on matching surfaces of the two blocks.

In a preferred embodiment, the tilter device is further provided with means for facilitating separation of the two tilter blocks via cancellation of the above-described meshing engagement.

BRIEF DESCRIPTION OF THE FIGURES

Further features and advantages of the present invention will be made clearer from the ensuing description, reference being made to the accompanying drawings, in which:

FIG. 7 is a side view of the tilter device shown in FIG. 4.

DETAILED DESCRIPTION OF THE INVENTION

Figure 1:
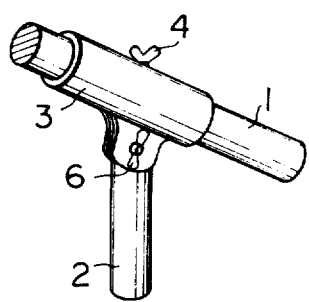
FIG. 1 is a perspective view of an example of the conventional connector with the stem in a tilted disposition.
Figure 2:
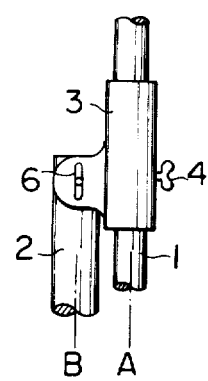
FIG. 2 is a side view of the connector shown in FIG. 1 with the stem in the upright disposition.

An example of the conventional tilter device used for musical instruments, such as cymbals and drums, is shown in FIGS. 1 and 2, in which a stem 1 and a standard 2 is coupled to each other by a connector 3. The stem 1 supports musical instruments at the free end thereof (which are not shown in the drawing for purposes of simplicity), whereas the standard 2 is carried by a base at the bottom end thereof (also not shown in the drawing). The stem 1 is linearly movable and adjustably set to the connector 3 by a set screw 4 and the stem 1 is swingably movable and is set relative to the standard 1 by connector 3 having set screw 6.

When the tilter device is to be used, the standard 2 is placed at a position somewhat distant from the player of the musical instrument, which the tilter device is intended to hold, in order to allow free action of the player, whereas the stem 1 is held in a tilted disposition so that the musical instrument is brought to a position suited for the players use. This tilted disposition is shown in FIG. 1.

When the tilter device is to be folded for transportation or storage, the connector 3 is turned by loosening the set screw 6 until the stem 1 runs parallel with the standard 2 as shown in FIG. 2 and the set screw 4 is loosened in order to allow almost the entire length of the stem 1 to be positioned side by side with the standard 2.

In this folded disposition, the bulky parallel arrangement of the two elongated elements 1 and 2 causes considerable inconveniency in the transportation of the tilter device. In addition, as shown in FIG. 2, the center axis A of the stem 1 is not in alignment with the center axis B of the standard 2 in the folded disposition. The means that, when the tilter device is used with the stem 1 in the upright disposition while carrying a musical instrument atop thereof, the center of gravity of the mass composed of the stem 1 and the musical instrument carried thereby is laterally deviated from the center of gravity of the standard 2 and its related parts. This deviation in the center of gravity leads to unstable support of the musical instrument by the tilter device, especially when the musical instrument supported by the tilter device is of a rather heavy construction as is the case with cymbals and drums. Thus, the conventional tilter device is unsuited for supporting heavy musical instruments with the stem 1 in the upright disposition.

Figure 3:
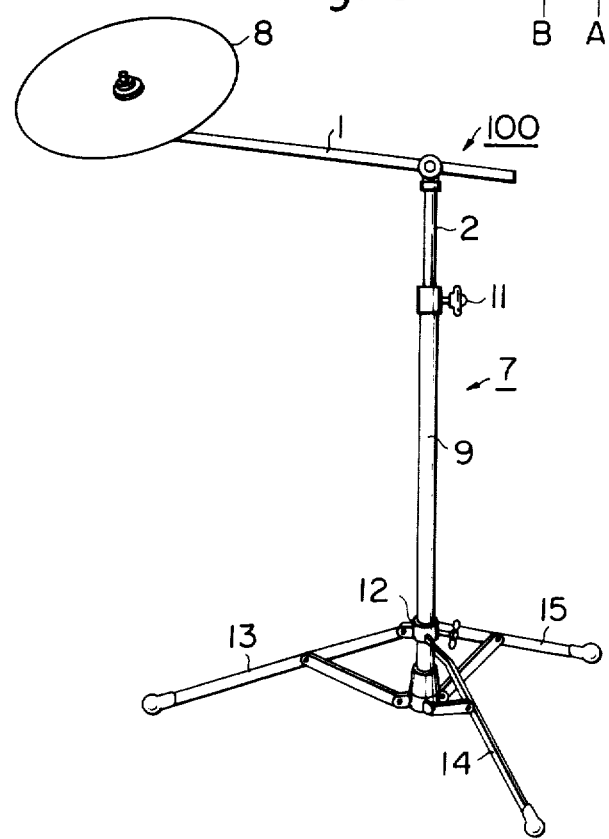
FIG. 3 is a perspective view of a stand used for holding a cymbal for which the adjustable tilter device, in accordance with the present invention, is used.

Referring to FIG. 3, the adjustable tilter device 100 in accordance with the present invention is used for a stand 7 for supporting a cymbal 8. The stem 1 of the adjustable tilter device 100 carrying the cymbal 8 at its free end is coupled in a tilted disposition to an elongated hollow tubular standard 2. The latter is securely received in an adjustable center post 9 via set screw 11. The degree of extension of the standard 2 from the center post can be freely adjusted and fixed by hand operating the set screw 11 just like in the case of the conventional tilter device. The center post 9 is supported at its bottom by a tripod 12 set on the floor by three adjustable legs 13 through 15.

Figure 4:
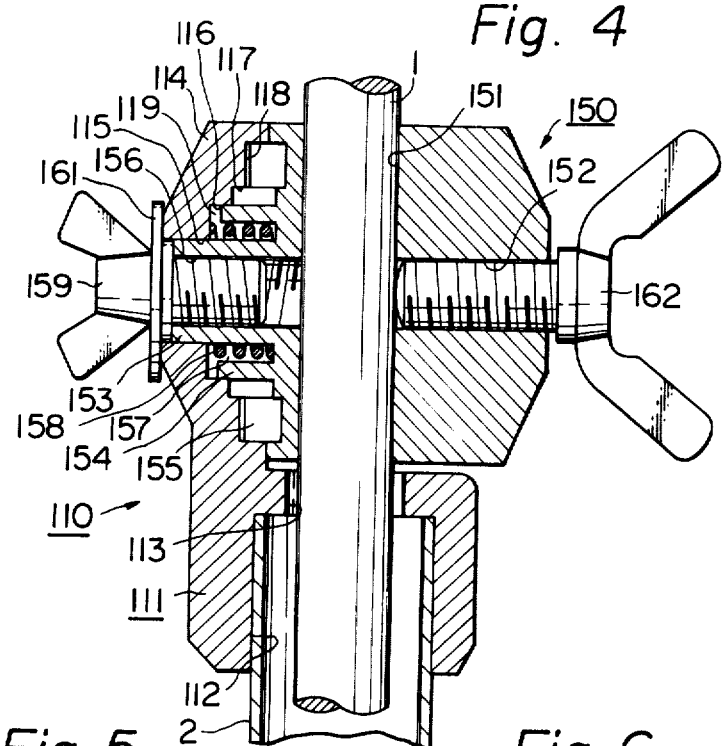
FIG. 4 is a sectional view of one embodiment of the adjustable tilter shown in FIG. 3.

One embodiment of the adjustable tilter device 100 in accordance with the present invention is shown in FIG. 4, in which the tilter device 100 is comprised, as a major element, of a stationary tilter block 110 and a movable tilter block 150, coupled to the former.

The stationary tilter block 110 is provided at its bottom with a collar 111 which has a large diameter hole 112 for receiving the upper end of standard 2 and a small diameter hole 113 merging into and in axial alignement with the large diameter hole 112. The diameter of the small diameter hole 113 is so designed as to allow free passage of the end portion of the stem 1. The stem 1 is also freely insertable into the hollow tubular standard 2 from the upper opening of the latter.

Figure 5:
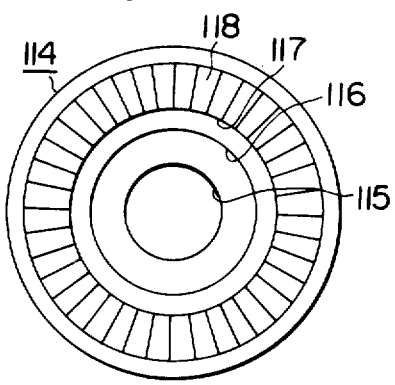
FIG. 5 is an explanatory end view of the main part of the stationary tilter block used in the tilter device shown in FIG. 4.

The stationary block 110 is further provided with a main body 114 formed atop and integrally of the collar 111. A through-hole 115 is formed in the main body 114 so that its axis lies in a direction which forms a right angle with respect to the axes of holes 112 and 113. A pair of annular steps 116 and 117 are formed concentrically around the through hole 115 on the side of the main body 114 engageable with the movable tilter block 150. Just outside and surrounding the outer annular step 117, radial serrations 118 are formed on the main body 114 in an annular arrangement as clearly shown in FIG. 5.

The movable block 150 is provided with a through-hole 151 for receiving stem 1, allowing free passage of stem 1 and this through-hole 151 is in axial alignment with the holes 112 and 113 of the stationary tilter block 110 when both blocks 110 and 150 are coupled to each other and aligned as shown in FIG. 4. The movable block 150 is further provided with a threaded hole 152 which extends at a right angle with respect to the through-hole 151 and internally terminating in the through-hole 151. The threaded hole 152 is formed in axial alignement with the through-hole 115 of the stationary tilter block 110 when blocks 110 and 150 are coupled to each other.

Figure 6:
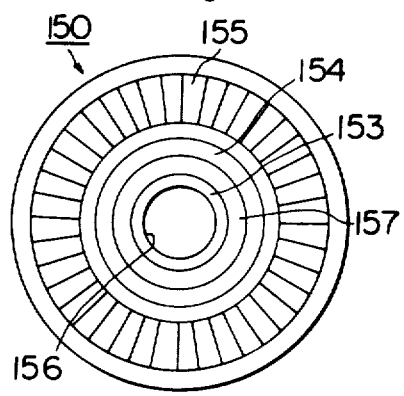
FIG. 6 is an explanatory end view of the main part of the movable tilter block used in the tilter device shown in FIG. 4.

On the side facing the stationary tilter block 110, the movable block 150 is provided with an inner cylindrical extension 153 whose outer diameter is slightly smaller than the diameter of the through-hole 115 of the stationary tilter block 110 so that the extension 153 is snugly insertable into the through-hole 115 when the two blocks 110 and 150 are coupled to each other. An outer cylindrical extension 154 is formed around the inner cylindrical extension 153, and its inner diameter cooperates with the outer diameter of cylindrical extension 153 to define hollow annular space 157. The outer diameter of extension 154 is slightly smaller than the diameter of the inner annular step 116 of the stationary tilter block 110. Thus the extension 154 is snugly fitted into the annular step 116 when the two blocks 110 and 150 are coupled to each other. Spacedly surrounding the outer cylindrical extension 154, there is provided radial serrations 155 in an annular arrangement as clearly shown in FIG. 6. The position and pattern of the radial serrations 155 on the movable tilter block 150 are designed so as to fairly correspond to those of the radial serrations 118 on the stationary tilter block 110. The inner cylindrical extension 153 of the movable tilter block has a threaded hole 156 which is formed in axial alignment with the other threaded hole 152 and internally terminates in the through-hole 151.

In the disposition shown in FIG. 4 in which the tilter blocks 110 and 150 are coupled to each other, a helical compression spring 158 is inserted in the annular space 157 around the inner cylindrical extension 113 of the movable tilter block 150, a set screw 159 is screwed into the threaded hole 156 of the inner cylindrical extension 153 in order to fixedly couple the stationary tilter block 110 to the movable tilter block 150 via an accompanying washer 161 agains repulsion by the compression spring 158 and another set screw 162 is screwed into the threaded hole 152 of the movable tilter block 150 in such an arrangement that the inner end of the set screw 162 presses the stem 1 against the wall of the block 150 defining the hole 151 in order to prevent free passage of the stem 1 into the hole 151.

In this coupled disposition, the serrations 118 on the stationary tilter block 110 are in a meshing engagement with those 155 on the movable tilter block 150, the outer cylindrical extension 154 of the movable tilter block 150 is snugly received in the annular step 116 of the stationary tilter block 110 while leaving a small space 119 between the free end of the extension 154 and the stationary block 110, and the inner cylindrical extension 153 of the movable tilter block 150 is snugly accommodated in the through-hole 115 of the stationary tilter block 110 also. The stationary tilter block 110 may be fixed to the standard 2 by a suitable set screw (not shown).

In the disposition shown in FIG. 4, the stem 1 is held in the upright state and the center line of the stem 1 is in an axial alignment with that of the standard 2 so that there should be no lateral deviation between the centers of gravity of the two elements 1 and 2. When this disposition is compared with that shown in FIG. 2, it will be well understood that the stand using the tilter device 100 in accordance with the present invention is by far more stable than the stand accompanied with the conventional connector 3 with the stem 1 being used in the upright state in order to support musical instruments or the like of relatively large weight.

When the stand is to be folded for the purpose of transportation or storage, the set screw 162 in FIG. 4 is loosened for liberation of the stem 1 and the stem 1 is inserted into the standard 2. Thus, folding of the stand can be completed in telescopic manner and this assures a very compact folded construction of the stand which is very convenient for transportation and storage.

When the stand 7 is to be used with the stem 1 being in a tilted disposition, the set screw 162 is loosened, the stem 1 is extracted out of the standard 2 until the lower end thereof arrives, at least to a height above the level of the bottom end of the movable tilter block 150 and the set screw 162 is provisionally fastened again. Thus, the stem 1 is fixed to the movable tilter block 150 only irrespective of the stationary tilter block 110.

Next, the other set screw 159 is somewhat loosed to such an extent that the meshing engagement between the serrations 118 and 155 is automatically released due to the repulsion by the compression spring 158 in the annular space 157. Use of the compression spring 158 on one hand well facilitates the separation of the serrations from meshing engagement and, on the other hand, well prevents accidental loosening of the set screw 159 during the use of the stand 7.

By this displacement of the serrations from meshing engagement, the movable tilter block 150 is put in a condition freely turnable about the center axis of its threaded hole relative to the stationary tilter block 110.

After turning the movable tilter block 150 over the desired center angle in the above-described sense, together with the stem 1 fixedly held thereby, the set screw 159 is fastened again in order to return the serrations 118 and 155 into meshing engagement, thereby fixedly coupling the tilter blocks 110 and 150. Use of the compression spring 158 facilitates this swinging of the movable tilter block 150 relative to the stationary tilter block 110 as the repulsion by the spring 158 maintains the serrations 118 and 155 in a displaced fashion throughout the procedure.

Finally, the set screw 162 is loosened again in order to adjust the length of the portion of the stem 1 extending from the tilter device 100. After all the operations are completed, the stem 1 assumes a tilted disposition such as shown in FIG. 7.

In order to fold the stand 7 from the disposition shown in FIG. 7, the above-described operations are performed in the reverse order.

As is clear from the foregoing description, use of the novel tilter device in accordance with the present invention assures enhanced stability of the stand when carrying even heavy objectives, a remarkably compact folded construction of the stand specially convenient for transportation and/or storage and easy adjustment of the tilting direction of the stem in accordance with the situation in which the stand is to be used.

What is claimed is:

1. Adjustable tilter device used for holding objects such as musical instruments comprising, in combination:
    a hollow elongated standard having an open upper end;
    a stem freely slidably insertable into said standard from said open upper end;
    a stationary tilter block coupled to the upper end of said standard and having a third through hole formed therein;
    a movable tilter block having a first through hole for receiving said stem and formed in axial alignment with said hollow elongated standard in such an arrangement that said stem is insertable into said standard through said first through hole;
    means for establishing a separable meshing engagement between said two blocks and including first serrations formed on the matching surface of said stationary tilter block and second serrations formed on the matching surface of said movable tilter block for making meshing engagement with said first serrations;
    a first cylindrical extension formed on said matching surface of said movable tilter block and accommodated snugly within said third through hole in said stationary tilter block and having a fourth through hole opening in the free end thereof;
    a set screw into said fourth threaded hole formed in said cylindrical extension from the side of said stationary tilter block;
    means for detachably securing said stem to said movable tilter block; and
    thereby, when said establishing means is rendered ineffective, said movable tilter block is swingable about a given center axis relative to said stationary tilter block in order to enable adjustment of the tilting direction of said stem with respect to said standard.

2. Adjustable tilter device as claimed in claim 1 in which said movable tilter block has a second threaded through-hole extending at a right angle relative to a first through-hole formed in said movable tilter block in communication therewith and said fixing means includes a set screw screwed into said second threaded through-hole in order to press said stem against said movable tilter block.

3. Adjustable tilter device as claimed in claim 1 in which said meshing engagement establishing means further includes a second cylindrical extension formed so as to be spaced from and to surround said first cylindrical extension and accommodated snugly within an annular step formed around said third through-hole.

4. Adjustable tilter device as claimed in claim 3 further comprising a compression spring inserted between said two cylindrical extensions with one end in abutment against said matching surface of said stationary tilter block and the other end in abutment against said matching surface of said movable tilter block.

5. Adjustable tilter device as claimed in claim 4 wherein said spring is a helical spring.

6. Adjustable tilter device as claimed in claim 1 in which said first serrations extend radially with respect to the center axis of said third through-hole whereas said second serrations extend radially with respect to the center axis of said fourth threaded hole, said third and fourth holes being formed coaxially to each other.

7. Adjustable tilter device as claimed in claim 5 in which said first serrations are arranged annularly around said third through-hole whereas said second serrations are arranged annularly around said fourth threaded hole.

* * * * *